– –

United States Patent Office 3,726,872
Patented Apr. 10, 1973

3,726,872
AMINOMETHYLBICYCLONONENES AND DIHYDRO DERIVATIVES THEREOF
Robert Norman Schut, Edwardsburg, Mich., assignor to Miles Laboratories, Inc., Elkhart, Ind.
No Drawing. Filed Aug. 28, 1970, Ser. No. 67,990
Int. Cl. C07d 51/70
U.S. Cl. 260—268 BC
4 Claims

ABSTRACT OF THE DISCLOSURE

Certain aminomethylbicyclononenes and dihydro derivatives thereof as well as methods for their preparation are disclosed. The compounds are useful as analgesics and tranquilizers either in the form of their free bases or as acid addition salts.

SUMMARY OF THE INVENTION

The compounds of this invention correspond to the formulas

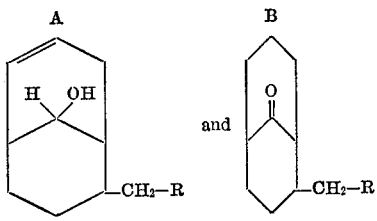

wherein R is 4-phenyl-1-piperazyl, diloweralkylamino wherein loweralkyl is methyl, ethyl, propyl or butyl, and N-methyl-N-phenethylamino. These compounds exhibit analgesic and tranquilizer activity when injected subcutaneously into an animal at a dosage of 100 mg./kg. of body weight either as the free base or an acid addition salt.

The novel compounds of the present invention can be prepared as shown in the following equations where R is as previously defined.

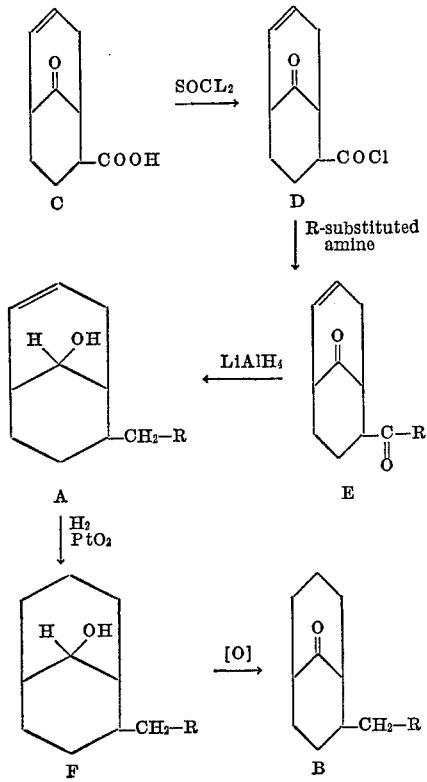

In carrying out these reactions, the known carboxylic acid C, prepared according to the method of Cope et al. described in the Journal of the American Chemical Society, volume 72, pages 5228–5232, is converted to the acid chloride D by reaction with thionyl chloride and heating under reflux. The solution is concentrated under vacuum and the residue transformed to the ketoamide E by reaction in ethyl ether with the appropriate R-substituted amine in aqueous sodium hydroxide solution under reflux conditions. This intermediate is then refluxed with lithium aluminum hydride to form the desired aminoalcohol A as the free base which can be readily converted to a pharmacologically acceptable salt by reaction with such acids as hydrochloric, hydrobromic, maleic and the like in a solvent such as propyl alcohol or ethyl acetate. Catalytic hydrogenation over platinum oxide of compound A will produce the saturated aminoalcohol F which is oxidized in a solution of potassium tertiary butoxide and fluorenone to the desired saturated aminoketone B according to the method of Warnhoff as described in the Journal of Organic Chemistry, 28, 1431 (1963). The precise conditions employed to produce the specific compounds embraced within the scope of this invention are set forth in the examples which follow.

PREFERRED EMBODIMENTS OF THE INVENTION

EXAMPLE 1

R is 4-phenyl-1-piperazyl in Formula A

A 1.8 gram (0.01 mole) sample of 9-oxobicyclo[3.3.1] non-3-en-1-carboxylic acid (M.P.=134° C.) was dissolved in 10 ml. of thionyl chloride and heated under reflux for 30 minutes. The solution was concentrated under vacuum to yield 2.03 grams of the corresponding carbonyl chloride as a yellow oil. A sample of 57.9 grams of said chloride in 200 ml. of ether was added to a stirred mixture of 50 grams (0.31 mole) of N-phenyl-piperazine in 400 ml. of ether and 200 ml. of 20% aqueous sodium hydroxide solution. The addition was carried out rapidly enough to maintain reflux and stirring was continued thereafter at room temperature for 25 minutes. The organic layer which formed was separated, washed with water, dried and concentrated under vacuum. The syrupy residue was crystallized from ether to obtain 63 grams of 1-(4-phenyl-1-piperazyl)carbonylbicyclo[3·3.1]non-3-en-9-one as a white solid melting at 127° C. after recrystallization from aqueous isopropyl alcohol.

A solution of 7.2 grams of the above prepared ketoamide in 125 ml. of dry tetrahydrofuran was added to a stirred suspension of 4 grams of lithium aluminum hydride in 125 ml. of tetrahydrofuran, and the resulting mixture was stirred under reflux for 8 hours. The excess hydride was destroyed with 90% aqueous tetrahydrofuran, and aqueous sodium hydroxide solution was added until a precipitate formed which was removed by filtration. The filtrate was concentrated under vacuum and the residue dissolved in chloroform. The dried extract was concentrated and crystallized from benzene to obtain 4 grams of the desired 1-(4-phenyl-1-piperazyl)methylbicyclo-[3·3.1]non-3-en-9-ol as a white solid melting at 152° C. which upon analysis contained 9.16% nitrogen compared to the calculated value of 8.97% nitrogen.

A 12.6 gram sample of the free base thus prepared was dissolved in 2-propanol and treated with 14 ml. of 2.77 normal hydrochloric acid. The hydrochloride was collected, washed with ethyl acetate, then ether and dried to yield 9.97 grams of white solid melting at 251° C.

EXAMPLE 2

R is 4-phenyl-1-piperazyl in Formula B

A solution of 9.28 grams (0.03 mole) of the 1-(4-phenyl - 1 - piperazyl)methylbicyclo[3·3.1]non-3-en-9-ol (prepared in Example 1) in 150 ml. of acetic acid containing 0.3 gram of platinum oxide was shaken in a stainless steel container for 24 hours at room temperature and an initial pressure of 50 pounds per square inch. The catalyst was removed and the acetic acid distilled under vacuum. The residue was stirred with aqueous sodium hydroxide solution and the free base extracted with chloroform. Drying and concentration produced 6.35 grams of 1-(4-phenyl - 1 - piperazyl)methylbicyclo[3·3.1]nonan-9-ol which after crystallization from benzene-ether melted at 178° C.

The saturated aminoalcohol thus prepared (5.54 grams) in 250 ml. of dry benzene was treated with 6 grams of potassium tertiary butoxide and 15 grams of fluorenone in 100 ml. of benzene. The mixture was stirred for 2 hours at room temperature, then 300 ml. of water were added and the organic phase separated and treated with two 150 ml. portions of 10% aqueous hydrochloric acid. The aqueous layer was made basic and the free base which formed was extracted with chloroform, dried, concentrated and crystallized from benzene-pentane to obtain 3.15 grams of the desired 1-(4-phenyl-1-piperazyl)methylbicyclo[3.3.1]nonan-9-one as a white solid which melted at 118° C. and upon analysis was found to contain 8.84% nitrogen compared to the theoretical value of 8.97% nitrogen. The hydrochloride prepared by the procedure of Example 1 melted at 246° C.

EXAMPLE 3

R is N-methyl-N-phenethylamino in Formulas A and B

The reaction of the acid chloride prepared in Example 1 with N-methyl-N-phenethylamine according to the procedure previously described produced 1-(N-methyl-N-phenethylamino)carbonylbicyclo[3·3.1]non - 3 - en-9-one in 83% yield as a viscous oil which was reduced with LiAlH₄ by the procedure likewise employed in Example 1 to obtain the corresponding 9-ol derivative in 64% yield boiling at 160° C. at 0.1 mm. pressure.

Catalytic hydrogenation of the 9-ol derivative over platinum oxide as described in Example 2 results in the formation of the corresponding saturated aminoalcohol which is oxidized with potassium tertiary butoxide and fluorenone as also previously described to obtain the desired 1-(N - methyl-N-phenethylamino)methylbicyclo[3·3.1]nonan-9-one having a molecular weight of 285.

EXAMPLE 4

R is dimethylamino in Formulas A and B

Eighteen grams (0.094 mole) of the acid chloride prepared in Example 1 was reacted with 8.47 grams (0.33 mole) of dimethylamine in ether and aqueous sodium hydroxide solution according to the method described in Example 1 to produce 16 grams of 1-dimethylamino carbonylbicyclo[3·3.1]non-3-en-9-one as a viscous oil which is reduced with lithium aluminum hydride to give the compound of Formula A in which R is dimethylamino with a molecular weight of 195. Hydrogenation of this product over platinum oxide and oxidation of the intermediate saturated aminoalcohol produces the desired saturated aminoketone of Formula B in which R is dimethylamino with a molecular weight of 195.

By substituting other amines such as diethylamine, di-n-propylamine and di-isobutylamine for dimethylamine in the foregoing procedure, the corresponding compounds of Formulas A and B are readily obtained in which R is diethylamino, di-n-propylamino and di-isobutylamino, respectively.

What is claimed is:

1. A compound having the formula

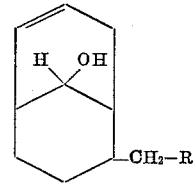

wherein R is a member selected from the group consisting of 4-phenyl-1-piperazyl, diloweralkylamino and N-methyl-N-phenethylamino and pharmaceutically acceptable acid addition salts thereof.

2. A compound as in claim 1 in which R is 4-phenyl-1-piperazyl.

3. A compound as in claim 1 in which R is N-methyl-N-phenethylamino.

4. A compound as in claim 1 in which R is dimethylamino.

References Cited

UNITED STATES PATENTS

| 3,689,490 | 9/1972 | Schut et al. | 260—268 BC |
| 3,108,998 | 10/1963 | Poos | 260—268 BC |
| 3,146,235 | 8/1964 | Nichols | 260—268 PH |
| 3,354,161 | 11/1967 | Schut | 260—268 PH |

OTHER REFERENCES

Cope et al.: Jour. Am. Chem. Soc., vol. 72, pp. 5228–32 (1950).

R. Gaylord: "Reduction with Complex Metal Hydrides," Interscience, 1956, pp. 554–5.

DONALD G. DAUS, Primary Examiner

U.S. Cl. X.R.

260—514 B, 563 P, 570.8 R; 424—250, 325, 330